United States Patent
Ikeda et al.

(10) Patent No.: US 10,326,290 B2
(45) Date of Patent: Jun. 18, 2019

(54) POWER CONVERTING DEVICE AND METHOD OF CONTROLLING POWER CONVERTING DEVICE

(71) Applicant: SHINDENGEN ELECTRIC MANUFACTURING CO., LTD., Chiyoda-ku (JP)

(72) Inventors: Masataka Ikeda, Hanno (JP); Seiichi Ando, Hanno (JP); Kazuo Yamashita, Hanno (JP)

(73) Assignee: SHINDENGEN ELECTRIC MANUFACTURING CO., LTD., Chiyoda-ku (JP)

( * ) Notice: Subject to any disclaimer, the term of this patent is extended or adjusted under 35 U.S.C. 154(b) by 0 days.

(21) Appl. No.: 15/752,912

(22) PCT Filed: Sep. 4, 2015

(86) PCT No.: PCT/JP2015/075252
§ 371 (c)(1),
(2) Date: Feb. 15, 2018

(87) PCT Pub. No.: WO2017/037950
PCT Pub. Date: Mar. 9, 2017

(65) Prior Publication Data
US 2018/0241230 A1    Aug. 23, 2018

(51) Int. Cl.
*H02J 7/14* (2006.01)
*H02H 11/00* (2006.01)
(Continued)

(52) U.S. Cl.
CPC ......... *H02J 7/0036* (2013.01); *B60L 11/1868* (2013.01); *H02H 11/005* (2013.01);
(Continued)

(58) Field of Classification Search
CPC .. H02J 2001/008; H02J 7/0029; H02J 7/0036; H02J 2007/0095; H02J 7/1423;
(Continued)

(56) References Cited

U.S. PATENT DOCUMENTS

2014/0354054 A1* 12/2014 Katou .................. H02J 7/0029
                                                                307/43
2015/0034406 A1*  2/2015 Hirose ................. B60L 3/0046
                                                                180/279
(Continued)

FOREIGN PATENT DOCUMENTS

JP    2006-42459 A    2/2006
JP    2011-185812 A   9/2011
(Continued)

OTHER PUBLICATIONS

International Search Report dated Nov. 24, 2015 in PCT/JP2015/075252 filed Sep. 4, 2015.

*Primary Examiner* — Fred E Finch, III
(74) *Attorney, Agent, or Firm* — Oblon, McClelland, Maier & Neustadt, L.L.P.

(57) ABSTRACT

A power converting device converts any of DC voltages outputted from at least two DC power supplies and outputs a converted voltage. A control unit of the power converting device determines whether a first contact and a second contact of a switch are melted and joined together based on a detection signal, before a second DC power supply outputs a second DC voltage.

12 Claims, 2 Drawing Sheets

(51) Int. Cl.
*H02J 7/00* (2006.01)
*B60L 11/18* (2006.01)
*H02M 3/335* (2006.01)

(52) U.S. Cl.
CPC .......... *H02J 7/1423* (2013.01); *H02J 7/1461* (2013.01); *H02J 7/1438* (2013.01); *H02J 2007/0095* (2013.01); *H02M 3/335* (2013.01); *Y02T 10/7005* (2013.01); *Y02T 10/92* (2013.01); *Y02T 90/127* (2013.01)

(58) Field of Classification Search
CPC ........ H02J 7/1438; H02J 7/1461; H02J 9/006; H02M 1/32; H02M 1/36; H02M 3/335; H02H 11/005; B60L 11/1868
See application file for complete search history.

(56) References Cited

U.S. PATENT DOCUMENTS

| | | | | |
|---|---|---|---|---|
| 2015/0035539 A1* | 2/2015 | Wakida | ................ | G01R 31/327 324/418 |
| 2015/0280632 A1* | 10/2015 | Kuroki | ................ | H02P 27/04 318/504 |
| 2016/0072422 A1* | 3/2016 | Kuroki | ................ | H02M 1/32 318/519 |
| 2016/0156258 A1* | 6/2016 | Yokoyama | .............. | H02M 1/32 307/82 |

FOREIGN PATENT DOCUMENTS

| | | |
|---|---|---|
| JP | 2014-232640 A | 12/2014 |
| JP | 2015-56356 A | 3/2015 |

\* cited by examiner

POWER CONVERTING DEVICE AND METHOD OF CONTROLLING POWER CONVERTING DEVICE

TECHNICAL FIELD

The present invention relates to a power converting device and a method of controlling a power converting device.

BACKGROUND ART

Power converting devices including a switch such as a contactor that is connected to an output of a DC power supply have been known (for example, JP 2006-42459 A).

A system 1000A in which such a power converting device 100A is used includes the power converting device 100A, a DC power supply (battery) 3, a vehicle control unit 5, a DC power supply from the DC power supply 3, a driving motor 4, and wheels 6.

The power converting device 100A includes, in an inverter housing, a pulse width modulation (PWM) power conversion module 13 configured to control the power from the DC power supply 3 using the vehicle control unit 5 and a power conversion control unit 12, and to convert the power from DC power to AC power, a discharge control circuit 11, an interlock circuit 21, a photocoupler 22 connected to the interlock circuit 21, and a switch 24 controlled by the vehicle control unit 5. A smoothing capacitor 23, which is an electrolytic capacitor, and a first discharge resistance 25 are connected in parallel to each other between a high potential input terminal and a low potential input terminal of the power converting device 100A. The first discharge resistance 25 discharges the electric charge of the smoothing capacitor 23 when the discharge control circuit 11 stops functioning.

The DC power from the DC power supply 3 is converted to AC power at the pulse width modulation (PWM) power conversion module 13 to drive the driving motor 4 and rotate the wheels 6. While the driving motor 4 is not being driven (during regeneration), three-phase AC power generated by the driving motor 4 is converted to DC power, which is supplied to the DC power supply 3.

In the power converting device 100A, the DC voltage outputted from the DC power supply (battery) 3 to the internal circuit (discharge control circuit 11, PWM power conversion module 13) is controlled by turning on/off of the switch 24 (FIG. 2).

The conventional power converting device 100A detects the fusing of the contacts of the switch 24 while the DC power supply 3 is outputting the DC voltage. Thus, the fusing of the switch 24 is detected while the output of the DC power supply 3 and the internal circuit are electrically connected to each other.

Therefore, if the switch 24 is fused (melted) in the conventional power converting device 100A, an unintended DC voltage may be outputted to the internal circuit due to the ON-state failure caused by the melting of the switch 24.

SUMMARY OF THE INVENTION

Problem to be Solved by the Invention

It is an object of the present invention to provide a power converting device capable of detecting the melting of contacts in a switch based on a DC voltage outputted from a DC power supply before a power supply voltage is outputted from an output terminal via the switch.

Solution to Problem

A power converting device according to an embodiment in an aspect of the present invention is a power converting device configured to convert any of DC voltages outputted from at least two DC power supplies, comprising:

a first DC power supply configured to output a first DC voltage;

an AC power supply configured to output an AC voltage;

a primary coil included in a transformer, the AC voltage outputted from the AC power supply being applied to the primary coil;

a secondary coil included in the transformer;

a first rectifier element having an end that is connected to an end of the secondary coil;

a capacitor having an end that is connected to another end of the first rectifier element, and another end that is connected to another end of the secondary coil;

a second DC power supply configured to output a second DC voltage that is different from the first DC voltage;

a switch including a first contact connected to an output of the second DC power supply, and a second contact connected to an output terminal for outputting a first power supply voltage, the switch being turned on to electrically connect the first contact and the second contact, and being turned off to electrically disconnect the first contact and the second contact;

a second rectifier element having an end that is connected to the end of the capacitor, and an another end that is connected to the first contact;

a detection element connected between the output terminal and the other end of the capacitor, and configured to output a detection signal based on a detection current flowing between the output terminal and the other end of the capacitor;

a switching element connected in series with the detection element between the output terminal and the other end of the capacitor; and a control unit that is supplied with a second power supply voltage to operate, receives the detection signal, and controls operations of the AC power supply, the switching element, and the switch, wherein before the second DC power supply outputs the second DC voltage, the control unit determines whether the first contact and the second contact of the switch are melted and joined together based on the detection signal.

In the power converting device, before the second DC power supply outputs the second DC voltage, and in a first state where the switch is in an off state and the AC power supply outputs an AC voltage, if the detection signal outputted when the switching element is turned on indicates that the detection current is equal to or more than a threshold value that is predefined, the control unit determines that the first contact and the second contact of the switch are melted and joined together; and in the first state, if the detection signal outputted when the switching element is turned on indicates that the detection current is less than the threshold value, the control unit determines that the first contact and the second contact of the switch are not melted and joined together.

In the power converting device, if determining that the first contact and the second contact of the switch are melted and joined together, the control unit prohibits the second DC power supply from outputting the second DC voltage, and maintains the off state of the switch.

In the power converting device,
after determining that the first contact and the second contact of the switch are not melted and joined together, and when the second DC power supply outputs the second DC voltage, the control circuit turns on the switch; and
when the switch is turned on, the switching element is turned off.

In the power converting device,
the first rectifier element is a first diode including an anode that is connected to the end of the secondary coil and a cathode that is connected to the end of the capacitor; and
the second rectifier element is a second diode including an anode that is connected to the end of the capacitor, and a cathode that is connected to the first contact of the switch.

In the power converting device,
in the first state, the second power supply voltage is generated from the first DC voltage.

In the power converting device,
a step-down circuit is further included, the step-down circuit being configured to output a stepped-down voltage obtained by stepping down the first power supply voltage in a second state where the second DC power supply outputs the second DC voltage and the switch is in an on state, wherein in the second state, the second power supply voltage is generated from the stepped-down voltage.

In the power converting device,
after the second power supply voltage generated from the first DC voltage is supplied to activate the control unit, the control circuit activates the AC power supply to output the AC voltage.

In the power converting device,
the detection element is an insulation signal transmitting element configured to insulation-transmit the detection signal based on the detection current.

In the power converting device,
the second DC voltage is higher than the first DC voltage.

In the power converting device,
the first DC power supply is mounted on a vehicle, and includes a low-voltage battery for outputting the first DC voltage, and the second DC power supply is mounted on the vehicle, and includes a high-voltage battery for outputting the second DC voltage.

A method of controlling a power converting device according to an embodiment in an aspect of the present invention is a method of controlling a power converting device configured to convert any of DC voltages outputted from at least two DC power supplies, the power converting device including:

a first DC power supply configured to output a first DC voltage;

an AC power supply configured to output an AC voltage;

a primary coil included in a transformer, the AC voltage outputted from the AC power supply being applied to the primary coil;

a secondary coil included in the transformer;

a first rectifier element having an end that is connected to an end of the secondary coil;

a capacitor having an end that is connected to another end of the first rectifier element, and another end that is connected to another end of the secondary coil;

a second DC power supply configured to output a second DC voltage that is difference from the first DC voltage;

a switch including a first contact connected to an output of the second DC power supply and a second contact connected to an output terminal for outputting a first power supply voltage, the switch being turned on to electrically connect the first contact and the second contact, and turned off to electrically disconnect the first contact and the second contact;

a second rectifier element having an end that is connected to the end of the capacitor, and another end that is connected to the first contact;

a detection element connected between the output terminal and the other end the capacitor, and configured to output a detection signal based on a detection current flowing between the output terminal and the other end of the capacitor;

a switching element connected in series with the detection element between the output terminal and the other end of the capacitor; and a control unit that is supplied with a second power supply voltage to operate, receives the detection signal, and controls operations of the AC power supply, the switching element, and the switch, the method including:
before the second DC power supply outputs the second DC voltage, determining, by the control unit, whether the first contact and the second contact of the switch are melted and joined together based on the detection signal.

Effects of the Invention

A power converting device according to an aspect of the present invention includes a first DC power supply configured to output a first DC voltage, an AC power supply configured to output an AC voltage, a primary coil included in a transformer, the AC voltage outputted from the AC power supply being applied to the primary coil, a secondary coil included in the transformer, a first rectifier element having an end that is connected to an end of the secondary coil, a capacitor having an end that is connected to another end of the first rectifier element, and another end that is connected to another end of the secondary coil, a second DC power supply configured to output a second DC voltage that is different from the first DC voltage, a switch including a first contact connected to an output of the second DC power supply, and a second contact connected to an output terminal for outputting a first power supply voltage, the switch being turned on to electrically connect the first contact and the second contact, and being turned off to electrically disconnect the first contact and the second contact, a second rectifier element having an end that is connected to the end of the capacitor, and an another end that is connected to the first contact, a detection element connected between the output terminal and the other end of the capacitor, and configured to output a detection signal based on a detection current flowing between the output terminal and the other end of the capacitor, a switching element connected in series with the detection element between the output terminal and the other end of the capacitor, and a control unit that is supplied with a second power supply voltage to operate, receives the detection signal, and controls operations of the AC power supply, the switching element, and the switch.

Before the second DC power supply outputs the second DC voltage, the control unit determines whether the first contact and the second contact of the switch are melted and joined together based on the detection signal.

More specifically, before the second DC power supply outputs the second DC voltage and in a first state where the switch is in an off state and the AC power supply is outputting the AC voltage, the control unit determines that the first contact and the second contact of the switch are melted and joined together if the detection signal outputted when the switching element is turned on indicates that the detection current is equal to or more than a threshold value that is predefined. On the other hand, the control unit determines that the first contact and the second contact of the switch are not melted and joined together if, in the first state, the detection signal outputted when the switching element is turned on indicates that the detection current is less than the threshold value.

Thus, whether the contacts of the switch are melted and joined together may be detected before the first power supply voltage is outputted via the switch based on the second DC voltage outputted from the second DC power supply.

If, for example, the control unit determines that the first contact and the second contact of the switch are melted and joined together, the control unit may prevent an unintended output of the power supply voltage by prohibiting the second DC power supply from outputting the second DC voltage, and maintaining the off state of the switch.

EMBODIMENTS FOR CARRYING OUT THE INVENTION

Embodiments of the present invention will now be described with reference to the accompanying drawings.

First Embodiment

Figure 1:
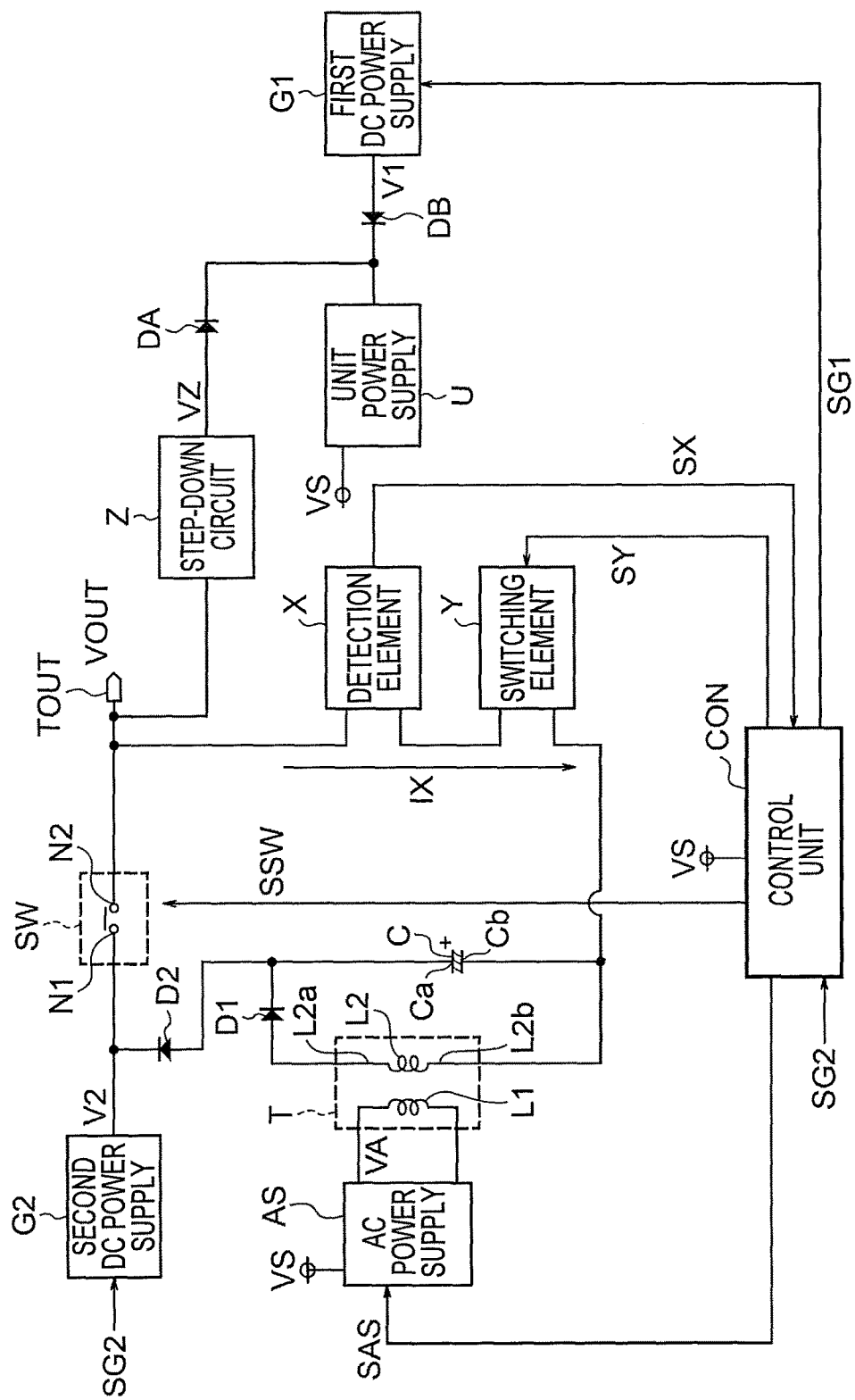
FIG. 1 is a diagram illustrating an example of the configuration of a power converting device 100 according to a first embodiment.
Figure 2:
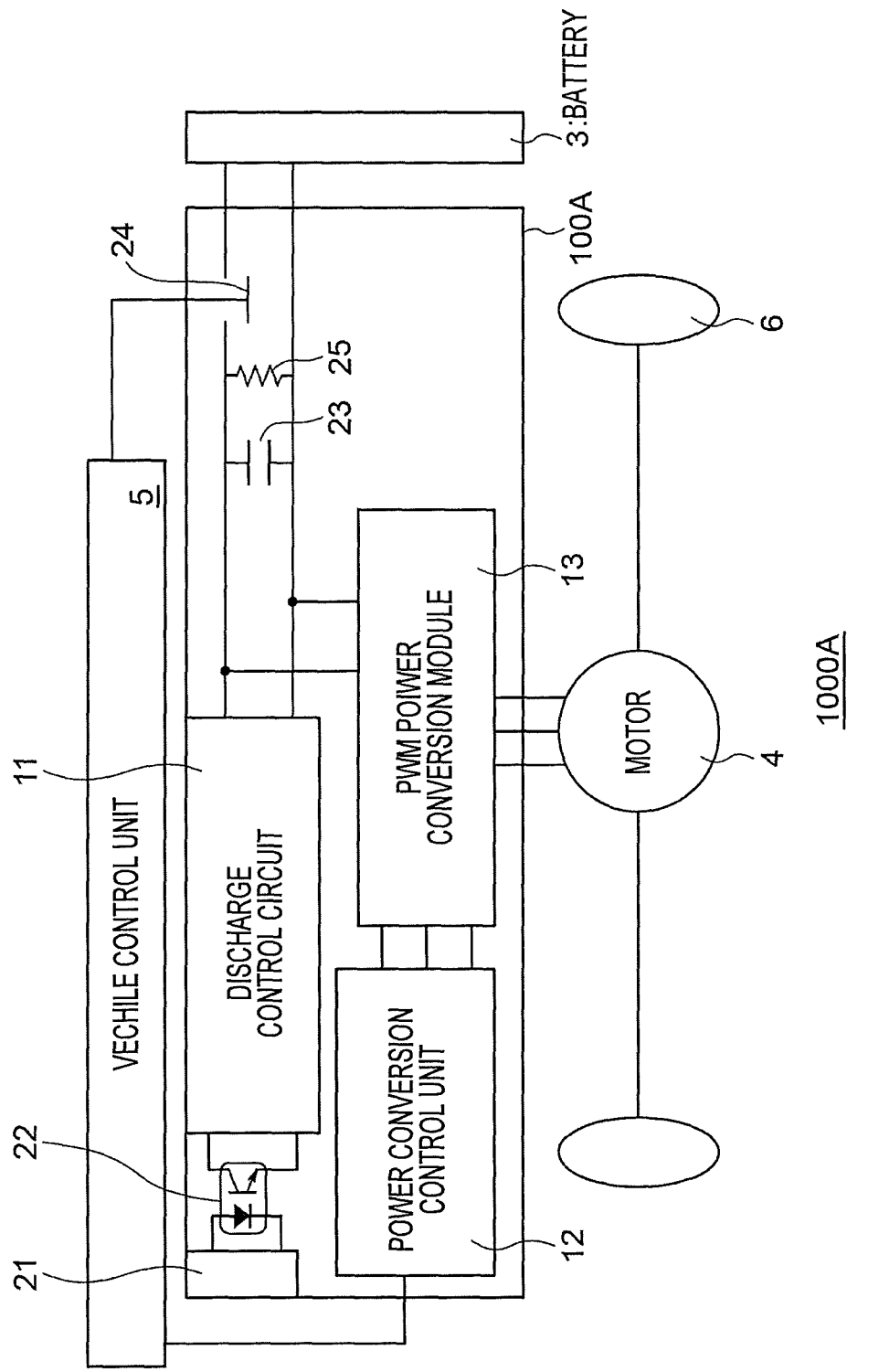
FIG. 2 is a diagram illustrating an example of the configuration of a conventional power converting device 100A.

FIG. 1 is a diagram illustrating an example of the configuration of a power converting device 100 according to a first embodiment. The power converting device 100 according to the first embodiment converts any of DC voltages outputted from at least two DC power supplies, and outputs a converted voltage.

As shown in FIG. 1, the power converting device 100 includes an AC power supply AS, a first DC power supply G1, a second DC power supply G2, a transformer T, a detection element X, a switching element Y, a first rectifier element D1, a second rectifier element D2, a capacitor C, a switch SW, an output terminal TOUT, a step-down circuit Z, a control unit CON, a unit power supply U, a first power supply diode DA, and a second power supply diode DB.

The first DC power supply G1 outputs a first DC voltage V1.

The first DC power supply G1 includes a low-voltage battery that is mounted on a vehicle (not shown), for example, and outputs the first DC voltage V1.

The AC power supply AS outputs an AC voltage VA.

The transformer T includes a primary coil L1 and a secondary coil L2.

The AC voltage VA outputted from the AC power supply AS is applied to the primary coil L1 included in the transformer T.

As described above, the secondary coil L2 is included in the transformer T, and outputs a voltage obtained by transforming the AC voltage VA applied to the primary coil L1.

The first rectifier element D1 has an end (anode) that is connected to an end L2a of the secondary coil L2, and another end (cathode) that is connected to an end Ca of the capacitor C. The first rectifier element D1 is, for example, a first diode with the anode connected to the end L2a of the secondary coil L2 and the cathode connected to the end Ca of the capacitor C as shown in FIG. 1.

The capacitor C has the end Ca that is connected to the other end (cathode) of the first rectifier element D1, and another end Cb that is connected to another end L2b of the secondary coil L2.

The second DC power supply G2 is configured to output a second DC voltage V2 that is different from the first DC voltage V1. The second DC power supply G2 is configured to be activated (to output the second DC voltage V2) in response to a control signal SG2.

The second DC power supply G2 includes a high-voltage battery that is mounted on the vehicle, for example, and outputs the second DC voltage V2. The second DC voltage V2 is set to be higher than the first DC voltage V1, for example.

The output terminal TOUT outputs a first power supply voltage VOUT.

The switch SW includes a first contact N1 connected to the output of the second DC power supply G2 and a second contact N2 connected to the output terminal TOUT.

The switch SW is turned on to electrically connect the first contact N1 and the second contact N2, and turned off to electrically disconnect the first contact N1 and the second contact N2.

For example, the switch SW is a contactor or a relay.

The second rectifier element D2 has an end (anode) that is connected to the end Ca of the capacitor C (the other end (cathode) of the first rectifier element D1) and another end (cathode) that is connected to the first contact N1.

As shown in FIG. 1, the second rectifier element D2 is, for example, a second diode with the anode connected to the end Ca of the capacitor C and the cathode connected to the first contact N1 of the switch SW.

The detection element X is connected between the output terminal TOUT and the other end Cb of the capacitor C. The detection element X is configured to output a detection signal SX based on a detection current IX flowing between the output terminal TOUT and the end Cb of the capacitor C.

The detection element X is an insulation signal transmitting element for insulation-transmitting the detection signal SX based on the detection current IX. In this case, the detection element X is a photocoupler outputting the detection signal SX based on the detection current IX, for example.

The switching element Y is connected in series with the detection element X between the output terminal TOUT and the end Cb of the capacitor C.

The switching element Y is controlled by a control signal SY.

For example, the switching element Y is turned on in response to the control signal SY. As a result, the end and the other end of the switching element Y are electrically connected to each other to allow the detection current IX to flow. The switching element Y is also turned off in response to the control signal SY to disconnect the end and the other end, thereby interrupting the detection current IX. For example, the switching element Y is a photo-MOS relay.

In a second state where the second DC power supply G2 is outputting a second DC voltage V2 and the switch SW is in an on state, the step-down circuit Z outputs a stepped-down voltage VZ obtained by stepping down the first power supply voltage VOUT of the output terminal TOUT.

The first power supply diode DA has an anode that is connected to the output of the step-down circuit Z, and a cathode that is connected to the input of the unit power supply U.

The second power supply diode DB has an anode that is connected to the output of the first DC power supply G1, and a cathode that is connected to the input of the unit power supply U.

The unit power supply U is configured to generate a second power supply voltage VS from the first DC voltage V1 outputted from the first DC power supply G1 or the stepped-down voltage VZ outputted from the step-down circuit Z.

For example, the unit power supply U generates and outputs the second power supply voltage VS from the first DC voltage V1 outputted from the first DC power supply G1 before the second DC power supply G2 outputs the second DC voltage V2.

Alternatively, the unit power supply U generates and outputs the second power supply voltage VS from the stepped-down voltage VZ outputted from the step-down circuit Z when the second DC power supply G2 is outputting the second DC voltage V2 and the switch SW is in the on state.

The control unit CON is supplied with the second power supply voltage VS to operate.

The control unit CON receives the detection signal SX. Then, the control unit CON controls the operation of the AC power supply AS with a control signal SAS, the operation of the switching element Y with the control signal SY, and the operation of the switch SW with a control signal SSW.

For example, the control unit CON is configured to be activated by the supply of the second power supply voltage VS generated from the first DC voltage V1, and to activate the AC power supply AS with the control signal SAS to output the AC voltage VA.

The control unit CON also receives the control signal SG2, and obtains the operation state of the second DC power supply G2 (in particular, whether the second DC voltage V2 is being outputted) in response to the control signal SG2.

For example, before the second DC power supply G2 outputs the second DC voltage V2, the control unit CON determines whether the first contact N1 and the second contact N2 of the switch SW are melted and joined together based on the detection signal SX.

In particular, before the second DC power supply G2 outputs the second DC voltage V2 and in the first state where the switch SW is in the off state and the AC power supply AS is outputting the AC voltage VA, if the detection signal SX that is obtained when the switching element Y is turned on indicates that the detection current IX is equal to or above a threshold value, the control unit CON determines that the first contact N1 and the second contact N2 of the switch SW are melted and joined together.

In the first state, the second power supply voltage VS is generated from the first DC voltage V1 by the unit power supply U.

If the detection signal SX that is outputted when the switching element Y is turned on in the first state indicates that the detection current IX is less than the threshold value, the control unit CON determines that the first contact N1 and the second contact N2 of the switch SW are not melted and joined together.

If determining that the first contact N1 and the second contact N2 of the switch SW are melted and joined together, the control unit CON may prohibit the second DC power supply G2 from outputting the second DC voltage V2, and maintain the off state of the switch SW.

This prevents the first output terminal TOUT from outputting an unintended voltage when the first contact N1 and the second contact N2 of the switch SW are melted and joined together.

After determining that the first contact N1 and the second contact N2 of the switch SW are not melted and joined together, the control unit CON turns on the switch SW if the second DC voltage V2 needs to be outputted from the second DC power supply G2.

This helps supply the second DC voltage V2 outputted from the second DC power supply G2 to the first output terminal TOUT via the switch SW in the state where the first contact N1 and the second contact N2 are not melted and joined together and the switch SW operates normally.

When the switch SW is turned on, the control unit CON turns off the switching element Y.

This interrupts the detection current IX to reduce power consumption when the first contact N1 and the second contact N2 are not melted and joined together and the switch SW operates normally.

The control unit CON may output a result signal (not shown) based on the result of determining whether the first contact N1 and the second contact N2 of the switch SW are melted and joined together.

The other elements such as the CPU may obtain information on whether the first contact N1 and the second contact N2 of the switch SW are melted and joined together based on the result signal.

In the second state where the second DC power supply G2 is outputting the second DC voltage V2 and the switch SW is in the on state, the unit power supply U generates the second power supply voltage VS from the stepped-down voltage VZ.

As described above, after the control unit CON determines that the first contact N1 and the second contact N2 of the switch SW are not melted and joined together, and if the second DC voltage V2 needs to be outputted from the second DC power supply G2, the control unit CON outputs the control signal SSW to turn on the switch SW. At this time, the control unit CON turns on the switching element Y. If the detection signal SX that is outputted when the switching element Y is turned on indicates that the detection current IX is less than the threshold value (no signal is outputted), the control unit CON determines that the switch SW has not been brought into the on state by the control signal SSW. Based on this determination result, the control unit CON may output a signal indicating that the switch SW cannot be normally controlled, for example.

Next, an example of the operation of the power converting device 100 having the above described configuration will be described below.

For example, the control unit CON is activated by the supply of the second power supply voltage VS generated by the first DC voltage V1, and then activates the AC power supply AS with the control signal SAS to output the AC voltage VA.

The control unit CON then receives the control signal SG2 and, in response to the control signal SG2, obtains the operation state of the second DC power supply G2 (in particular, whether the second DC voltage V2 is being outputted).

The control unit CON then turns on the switching element Y with the control signal SY before the second DC power supply G2 outputs the second DC voltage V2. Thereafter, the control unit CON determines whether the first contact N1 and the second contact N2 of the switch SW are melted and joined together based on the detection signal SX outputted by the detection element X.

In particular, before the second DC power supply G2 outputs the second DC voltage V2 and in the first state where the switch SW is in the off state and the AC power supply AS is outputting the AC voltage VA, the control unit CON determines that the first contact N1 and the second contact N2 of the switch SW are melted and joined together if the detection signal SX that is outputted when the switching element Y is turned on indicates that the detection current IX is equal to or more than the predefined threshold value.

If the detection signal SX that is outputted when the switching element Y is turned on indicates that the detection current IX is less than the threshold value in the first state, the control unit CON determines that the first contact N1 and the second contact N2 of the switch SW are not melted and joined together.

According to the above operation, the control unit CON may determine whether the first contact N1 and the second contact N2 of the switch SW are melted and joined together before the first power supply voltage VOUT is outputted from the first output terminal TOUT via the switch SW.

As described above, a power converting device according to an aspect of the present invention includes a first DC power supply configured to output a first DC voltage, an AC power supply configured to output an AC voltage, a primary coil included in a transformer to which the AC voltage outputted by the AC power supply is applied, a secondary coil included in the transformer, a first rectifier element having an end that is connected to an end of the secondary coil, a capacitor having an end that is connected to another end of the first rectifier element, and another end that is connected to another end of the secondary coil, a second DC power supply configured to output a second DC voltage that is different from the first DC voltage, a switch including a first contact connected to an output of the second DC power supply, and a second contact connected to an output terminal that outputs a first power supply voltage, the switch being turned on to electrically connect the first contact and the second contact, and turned off to electrically disconnect the first contact and the second contact, a second rectifier element having an end that is connected to the end of the capacitor and another end that is connected to the first contact, a detection element connected between the output terminal and the other end of the capacitor, and outputs a detection signal based on a detection current flowing through the output terminal and the other end of the capacitor, a switching element connected in series with the detection element between the output terminal and the other end of the capacitor, and a control unit that is supplied with a second power supply voltage to operate, receives a detection signal, and controls operations of the AC power supply, the switching element, and the switch.

Before the second DC power supply outputs the second DC voltage, the control unit determines whether the first contact and the second contact of the switch are melted and joined together based on the detection signal.

More specifically, before the second DC power supply outputs the second DC voltage and in a first state where the switch is in an off state and the AC power supply is outputting the AC voltage, the control unit determines that the first contact and the second contact of the switch are melted and joined together if the detection signal outputted when the switching element is turned on indicates that the detection current is equal to or more than a threshold value that is predefined. On the other hand, the control unit determines that the first contact and the second contact of the switch are not melted and joined together if, in the first state, the detection signal outputted when the switching element is turned on indicates that the detection current is less than the threshold value.

Thus, whether the contacts of the switch are melted and joined together may be detected before the first power supply voltage is outputted via the switch based on the second DC voltage outputted from the second DC power supply.

If, for example, the control unit determines that the first contact and the second contact of the switch are melted and joined together, the control unit may prevent an unintended output of the power supply voltage by prohibiting the second DC power supply from outputting the second DC voltage, and maintaining the off state of the switch.

While certain embodiments have been described, these embodiments have been presented by way of example only, and are not intended to limit the scope of the inventions. The embodiments may be embodied in a variety of other forms. Furthermore, various omissions, substitutions and changes in the form of the methods and systems described herein may be made without departing from the spirit of the inventions. The embodiments and their modifications are included in the scope and the subject matter of the invention, and at the same time included in the scope of the claimed inventions and their equivalents.

The invention claimed is:

1. A power converting device configured to convert any of DC voltages outputted from at least two DC power supplies, comprising:
   a first DC power supply configured to output a first DC voltage;
   an AC power supply configured to output an AC voltage;
   a primary coil included in a transformer, the AC voltage outputted from the AC power supply being applied to the primary coil;
   a secondary coil included in the transformer;
   a first rectifier element having an end that is connected to an end of the secondary coil;
   a capacitor having an end that is connected to another end of the first rectifier element, and another end that is connected to another end of the secondary coil;
   a second DC power supply configured to output a second DC voltage that is different from the first DC voltage;
   a switch including a first contact connected to an output of the second DC power supply, and a second contact connected to an output terminal for outputting a first power supply voltage, the switch being turned on to electrically connect the first contact and the second contact, and being turned off to electrically disconnect the first contact and the second contact;
   a second rectifier element having an end that is connected to the end of the capacitor, and an another end that is connected to the first contact;
   a detection element connected between the output terminal and the other end of the capacitor, and configured to output a detection signal based on a detection current flowing between the output terminal and the other end of the capacitor;
   a switching element connected in series with the detection element between the output terminal and the other end of the capacitor; and
   a control unit that is supplied with a second power supply voltage to operate, receives the detection signal, and controls operations of the AC power supply, the switching element, and the switch, wherein
before the second DC power supply outputs the second DC voltage, the control unit determines whether the first contact and the second contact of the switch are melted and joined together based on the detection signal.

2. The power converting device according to claim 1, wherein:
before the second DC power supply outputs the second DC voltage, and in a first state where the switch is in an off state and the AC power supply outputs an AC voltage, if the detection signal outputted when the switching element is turned on indicates that the detection current is equal to or more than a threshold value that is predefined, the control unit determines that the first contact and the second contact of the switch are melted and joined together; and
in the first state, if the detection signal outputted when the switching element is turned on indicates that the detection current is less than the threshold value, the control unit determines that the first contact and the second contact of the switch are not melted and joined together.

3. The power converting device according to claim 2, wherein if determining that the first contact and the second contact of the switch are melted and joined together, the control unit prohibits the second DC power supply from outputting the second DC voltage, and maintains the off state of the switch.

4. The power converting device according to claim 2, wherein:
after determining that the first contact and the second contact of the switch are not melted and joined together, and when the second DC power supply outputs the second DC voltage, the control circuit turns on the switch; and
when the switch is turned on, the switching element is turned off.

5. The power converting device according to claim 2, wherein:
the first rectifier element is a first diode including an anode that is connected to the end of the secondary coil and a cathode that is connected to the end of the capacitor; and
the second rectifier element is a second diode including an anode that is connected to the end of the capacitor, and a cathode that is connected to the first contact of the switch.

6. The power converting device according to claim 2, wherein in the first state, the second power supply voltage is generated from the first DC voltage.

7. The power converting device according to claim 1, further comprising a step-down circuit configured to output a stepped-down voltage obtained by stepping down the first power supply voltage in a second state where the second DC power supply outputs the second DC voltage and the switch is in an on state, wherein in the second state, the second power supply voltage is generated from the stepped-down voltage.

8. The power converting device according to claim 2, wherein after the second power supply voltage generated from the first DC voltage is supplied to activate the control unit, the control circuit activates the AC power supply to output the AC voltage.

9. The power converting device according to claim 2, wherein the detection element is an insulation signal transmitting element configured to insulation-transmit the detection signal based on the detection current.

10. The power converting device according to claim 2, wherein the second DC voltage is higher than the first DC voltage.

11. The power converting device according to claim 10, wherein the first DC power supply is mounted on a vehicle, and includes a low-voltage battery for outputting the first DC voltage, and the second DC power supply is mounted on the vehicle, and includes a high-voltage battery for outputting the second DC voltage.

12. A method of controlling a power converting device configured to convert any of DC voltages outputted from at least two DC power supplies, the power converting device including:
a first DC power supply configured to output a first DC voltage;
an AC power supply configured to output an AC voltage;
a primary coil included in a transformer, the AC voltage outputted from the AC power supply being applied to the primary coil;
a secondary coil included in the transformer;
a first rectifier element having an end that is connected to an end of the secondary coil;
a capacitor having an end that is connected to another end of the first rectifier element, and another end that is connected to another end of the secondary coil;
a second DC power supply configured to output a second DC voltage that is difference from the first DC voltage;
a switch including a first contact connected to an output of the second DC power supply and a second contact connected to an output terminal for outputting a first power supply voltage, the switch being turned on to electrically connect the first contact and the second contact, and turned off to electrically disconnect the first contact and the second contact;
a second rectifier element having an end that is connected to the end of the capacitor, and another end that is connected to the first contact;
a detection element connected between the output terminal and the other end the capacitor, and configured to output a detection signal based on a detection current flowing between the output terminal and the other end of the capacitor;
a switching element connected in series with the detection element between the output terminal and the other end of the capacitor; and
a control unit that is supplied with a second power supply voltage to operate, receives the detection signal, and controls operations of the AC power supply, the switching element, and the switch,
the method comprising:
before the second DC power supply outputs the second DC voltage, determining, by the control unit, whether the first contact and the second contact of the switch are melted and joined together based on the detection signal.

* * * * *